US009568034B2

(12) United States Patent
Gabriel

(10) Patent No.: US 9,568,034 B2
(45) Date of Patent: Feb. 14, 2017

(54) CONNECTION ELEMENT FOR A SUPPORT FRAME SYSTEM

(71) Applicant: Liebherr-Transportation Systems GmbH & Co. KG, Korneuburg (AT)

(72) Inventor: Roman Gabriel, Vienna (AT)

(73) Assignee: Liebherr-Transportation Systems GmbH & Co. KG, Korneuburg (AT)

( * ) Notice: Subject to any disclaimer, the term of this patent is extended or adjusted under 35 U.S.C. 154(b) by 315 days.

(21) Appl. No.: 14/349,988

(22) PCT Filed: Oct. 5, 2012

(86) PCT No.: PCT/EP2012/004185
§ 371 (c)(1),
(2) Date: Apr. 4, 2014

(87) PCT Pub. No.: WO2013/050171
PCT Pub. Date: Apr. 11, 2013

(65) Prior Publication Data
US 2014/0241796 A1    Aug. 28, 2014

(30) Foreign Application Priority Data

Oct. 7, 2011 (DE) .................. 10 2011 115 319

(51) Int. Cl.
*F16B 7/04* (2006.01)
*F16S 3/08* (2006.01)
*F16B 7/18* (2006.01)

(52) U.S. Cl.
CPC ............... *F16B 7/04* (2013.01); *F16B 7/0446* (2013.01); *F16B 7/18* (2013.01); *F16B 7/042* (2013.01); *Y10T 403/7075* (2015.01)

(58) Field of Classification Search
CPC .......... F16B 7/044; F16B 7/0446; F16B 7/18; F16B 7/185; F16B 12/32; F16B 12/40; F16B 12/50; Y10T 403/342; Y10T 403/374
(Continued)

(56) References Cited

U.S. PATENT DOCUMENTS 2,972,495 A * 2/1961 Yalen ................. F16B 7/025
108/158.11
3,304,108 A * 2/1967 Hamilton .............. F16L 41/025
403/295
(Continued)

FOREIGN PATENT DOCUMENTS

AT  DE 102011115319 A1 *  4/2013  ............ F16B 7/0446
DE        203 00 469 U1      7/2003
(Continued)

OTHER PUBLICATIONS

International Search Report (PCT/ISA/210) with English translation dated Feb. 5, 2013 (Six (6) pages).
(Continued)

*Primary Examiner* — Robert Canfield
(74) *Attorney, Agent, or Firm* — Crowell & Moring LLP

(57) ABSTRACT

A connection element for a support frame system includes at least two part elements configured substantially in U shape and joinable together in mirror-inverted form. The elements can be plugged into one another in mirror-inverted form, with the first part element connectable to at least one fastening element and with the second part element connectable to at least one positioning element and/or having at least one positioning element.

13 Claims, 8 Drawing Sheets

(58) Field of Classification Search
USPC .......................... 52/81.3, 655.1, 656.9, 713
See application file for complete search history.

(56) References Cited

U.S. PATENT DOCUMENTS

| | | | | | |
|---|---|---|---|---|---|
| 3,353,853 | A | * | 11/1967 | Heywood | F16B 12/40 160/381 |
| 3,414,300 | A | * | 12/1968 | Spane | E04B 1/2604 403/300 |
| 3,582,029 | A | * | 6/1971 | Moesta | F16L 3/222 248/300 |
| 3,867,048 | A | * | 2/1975 | Endzweig | F16B 7/18 211/182 |
| 4,024,691 | A | * | 5/1977 | Hansen | E06B 3/9645 403/402 |
| 4,408,928 | A | * | 10/1983 | Steinke | F16B 7/0446 403/320 |
| 4,466,756 | A | * | 8/1984 | Wentworth | F16D 1/04 403/311 |
| 4,723,865 | A | * | 2/1988 | Rochau | F16B 7/0446 403/385 |
| 5,156,484 | A | * | 10/1992 | Allen | E04C 3/40 403/295 |
| 5,267,806 | A | * | 12/1993 | Bock | F16B 7/0446 403/260 |
| 6,203,239 | B1 | * | 3/2001 | Mucciaccciaro | F16B 7/025 256/65.03 |
| 7,201,398 | B1 | * | 4/2007 | Christofaro | B62D 21/02 180/312 |
| 8,800,239 | B2 | * | 8/2014 | Yang | E04B 1/24 403/218 |
| 9,343,799 | B2 | * | 5/2016 | Lettkeman | H01Q 1/12 |
| 2011/0252743 | A1 | * | 10/2011 | Yang | E04B 1/2403 52/849 |

FOREIGN PATENT DOCUMENTS

| | | |
|---|---|---|
| DE | 20 2009 011 529 U1 | 12/2009 |
| EP | 0 210 577 A1 | 2/1987 |
| FR | 2 481 387 A1 | 10/1981 |

OTHER PUBLICATIONS

German Search Report with English translation dated Nov. 11, 2013 (Nine (9) pages).

* cited by examiner

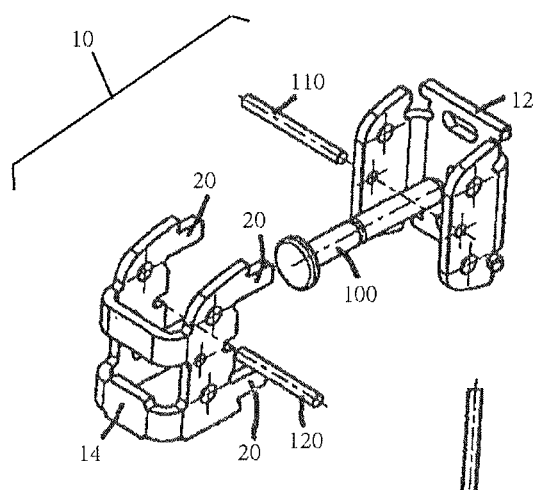
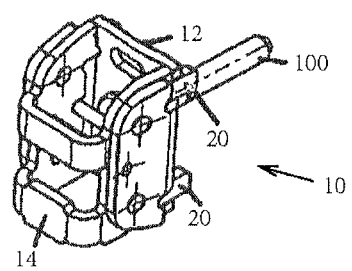
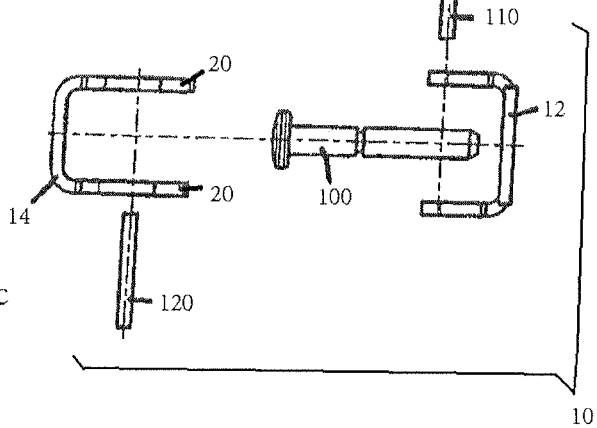

Fig. 2a
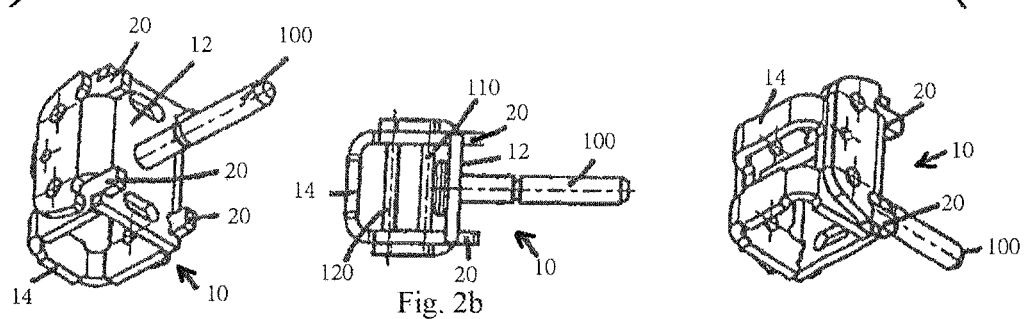
Fig. 2b
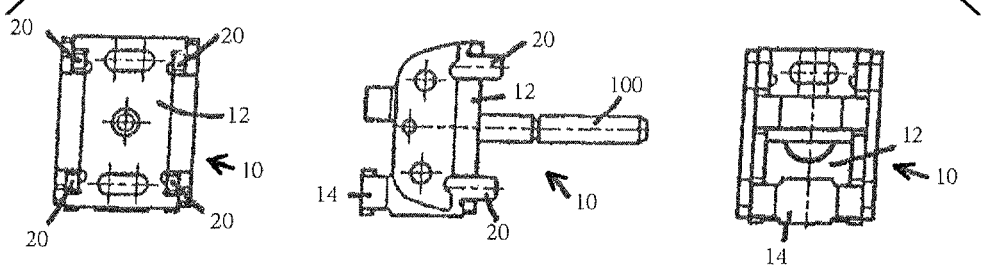
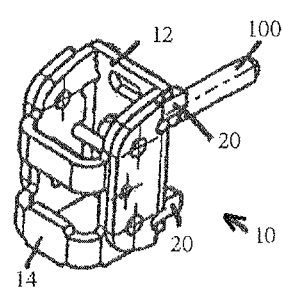
Fig. 2c

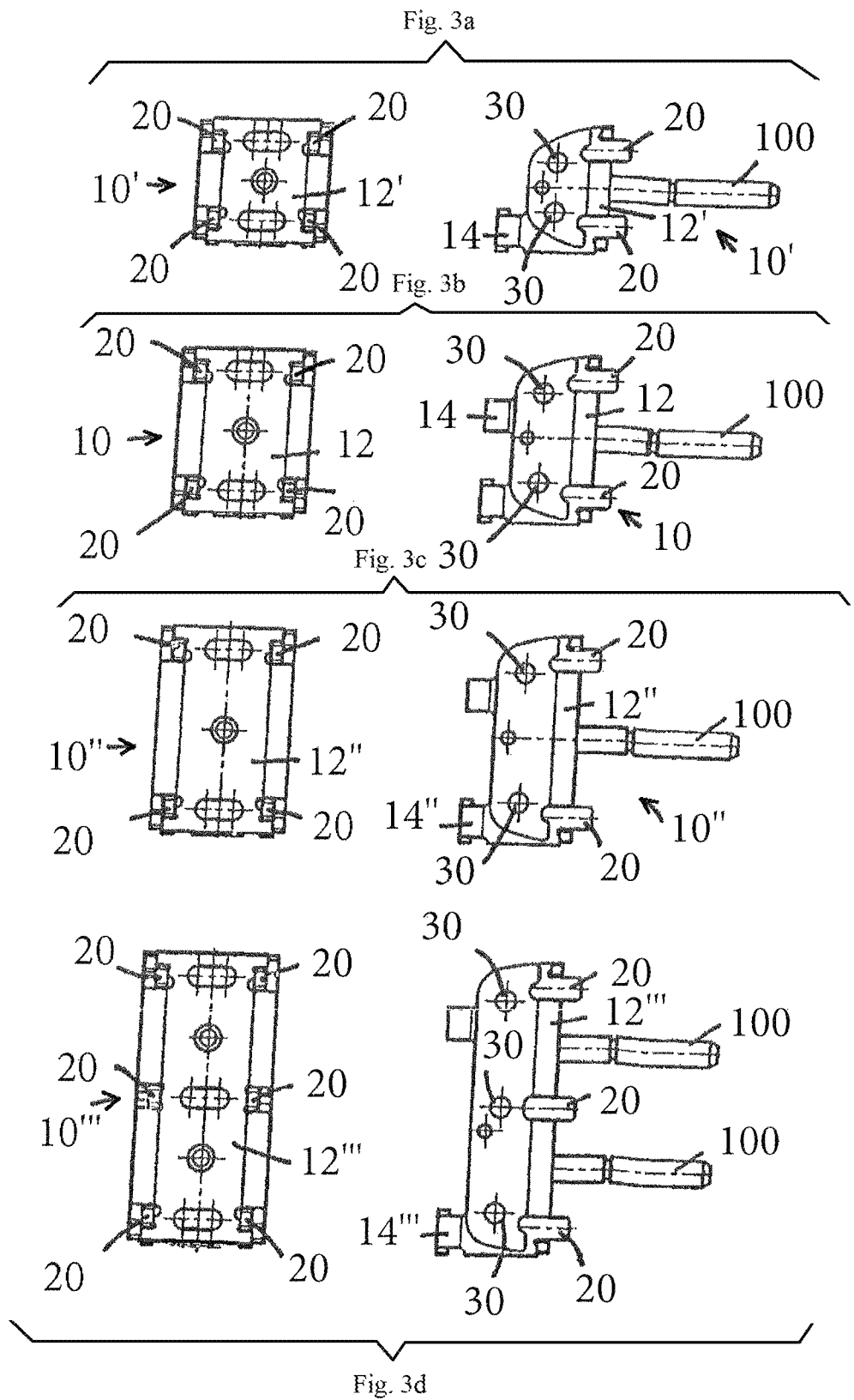

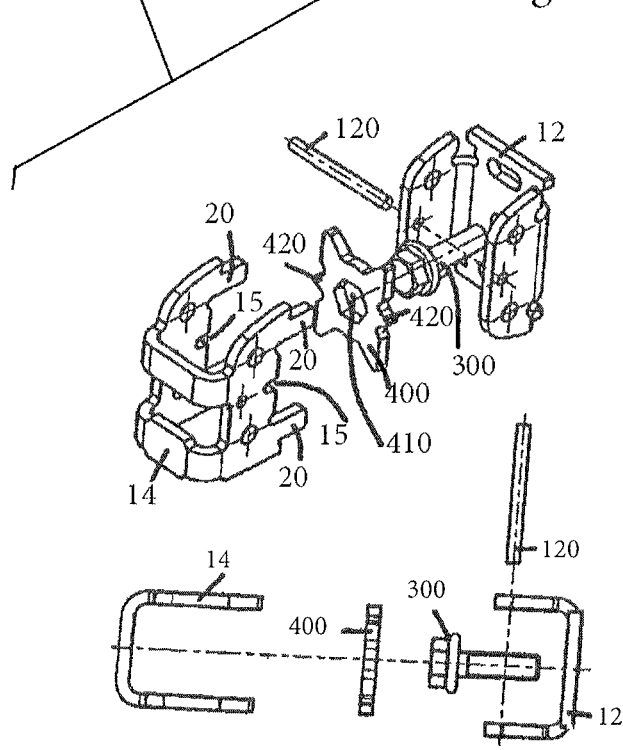
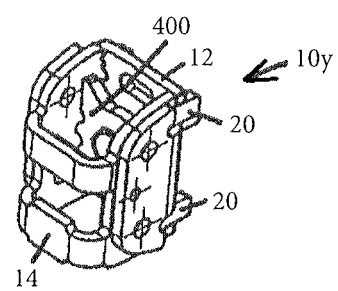
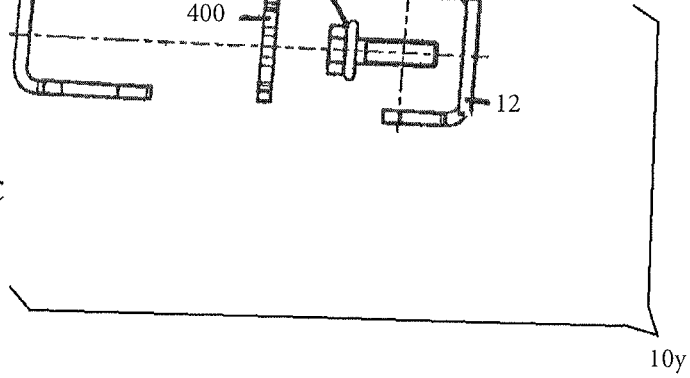
Fig. 5a
Fig. 5b
Fig. 5c

CONNECTION ELEMENT FOR A SUPPORT FRAME SYSTEM

BACKGROUND OF THE INVENTION

The present invention relates to a connection element for a support frame system, as well as to a support frame system having at least two support frame elements, and having at least one connection element.

Support frame systems in the intended form of use such as skeleton support frames are in particular formed by rectangular aluminum hollow sections which are joined together by means of weld connections.

The use of so-called ITEM sections and of corresponding connection elements or the use of gusset plates and angular elements is also known.

It has been found to be disadvantageous in the previously known approaches for the purpose of support frame systems that the known approaches are complex and expensive or also can only be positioned with respect to one another with a great effort without corresponding apparatus. It is also not easily possible to connect the sections of known support frame systems to one another, releasably or unreleasably, in a non-cutting manner, reliable in processing and secure against vibration.

SUMMARY OF THE INVENTION

It is therefore the object of the present invention to further develop a connection element and a support frame system of the initially named kind in an advantageous manner, in particular such that support frame elements can be connected to one another simply and reliably.

This object is achieved in accordance with the invention by a connection element for a support frame system including at least two part elements which are configured substantially in U shape and which can be or are joined together in mirror-inverted form, and in particular can be or are plugged into one another in mirror-inverted form, with the first part element being connectable or connected to at least one fastening element and with the second part element being connectable or connected to at least one positioning element and/or having at least one positioning element.

It thereby advantageously becomes possible to connect support frame elements of a support system simply and reliably to one another. A distinct positionability with respect to one another is in particular possible without any other apparatus and also when it is, for example, a question of support frame elements of different dimensions and materials. The support frame elements can, for example, be rectangular hollow sections of different dimensions and materials.

A connection of the support frame elements is possible in a non-cutting manner, reliable in processing and secure against vibration, with the support frame elements being non-releasably or releasably connectable to one another by means of the connection element. Angular connections from 0° to 360° are also possible in continuous form since the part elements configured in U shape can be correspondingly positioned and set by their shape.

It is possible that the fastening element comprises at least one closing eye bolt, at least one nut and/or at least one screw and/or that the fastening element is at least one closing eye bolt, at least one nut and/or at least one screw.

Provision can furthermore be made that at least one fastening attachment is provided by means of which the fastening element can be fastened and/or that a fastening pin is provided by means of which the fastening element, in particular the closing eye bolt, can be fastened and fixed.

It is moreover conceivable that the fastening attachment has at least one receiver, in particular a hexagon socket, into which the nut or the screw can be inserted. A corresponding nut, which has a hexagon head, or a screw having a hexagon head can be inserted into the receiver, in particular into the hexagon socket. The nut or the screw can thus be fixed in position and location by the fastening attachment. The fastening attachment can thus also transmit an assembly torque from the fastening element to the connection element.

Provision can furthermore be made that the fastening attachment has at least two nose-like projections and that the second U-shaped part element has at least two receivers, with the nose-like projections being able to be inserted into the receivers and with the fastening attachment hereby being able to be held substantially in the correct position and in a clamping manner in the assembled state of the connection element.

It is furthermore conceivable that the positioning element comprises at least one positioning spigot and/or that the positioning element is at least one positioning spigot.

Provision can furthermore be made that the first part element and the second part element each have at least two throughgoing rivet bores per flank which coincide in the assembled state of the connection element.

The present invention furthermore relates to a support frame system that is provided with at least two support frame elements and with at least one connection element, with the support frame elements being connectable or connected to one another by means of the connection element.

Provision can furthermore be made that a support frame element has bores into which the at least one positioning spigot can be or is inserted or into which positioning spigots can be or are inserted.

It is in addition possible that a support frame element has rivet bores and that rivets can be or are inserted through the rivet bores into the rivet bores of the connection element.

Further details and advantages of the invention will now be explained in more detail with reference to an embodiment shown in the drawings.

BRIEF DESCRIPTION OF THE DRAWINGS

FIGS. 1a-c show a first embodiment of a variable connection element in accordance with the invention;

FIGS. 2a-c show a plurality of views of the connection element shown in FIGS. 1a-c;

FIGS. 3a-d show a plurality of variations of the connection element shown in FIGS. 1a-c as well as of the connection element shown in FIGS. 1a-2c;

FIGS. 5a-c show a third embodiment of a variable connection element in accordance with the invention;

DETAILED DESCRIPTION OF THE INVENTION

Figure 4A:
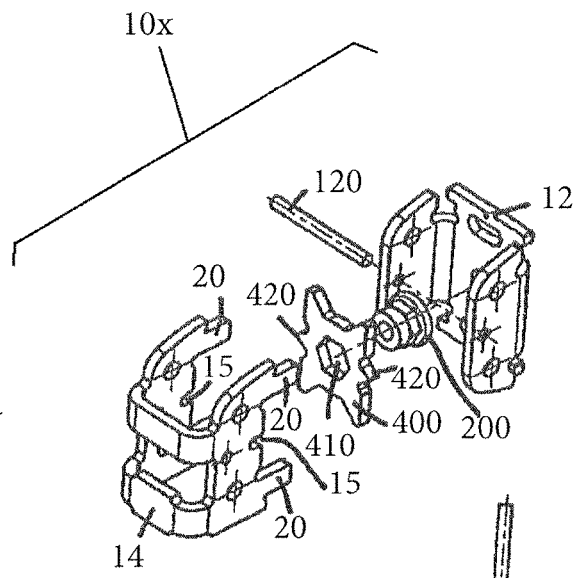
FIGS. 4a-c show a second embodiment of a variable connection element in accordance with the invention.

FIGS. 1a-c show several views, including an exploded representation and an assembled state, an embodiment of a variable connection element 10 with a closing eye bolt 100 in accordance with the invention.

The variable connection element 10 in this respect generally serves as a universal connection element for primarily rectangular hollow sections.

In this respect, only one single connection element size is advantageously required per hollow section cross-section size in order to be able to realize continuously, non-releasably or releasably, angular connections of 0° to 360°.

Support frame skeletons which are based on this variable section connection system can be directly provided with paneling, insertion elements, modular units and the like since the connection elements are invisibly integrated into the hollow sections, and thus planar, throughgoing support surfaces free of steps and overhangs can be realized.

Each connection element 10 (cf. also FIG. 2 and FIG. 3) substantially comprises two part elements 12 and 14 which are configured in U shape and which are plugged into one another with mirror inversion. The front part element 12 serves for reception of the fastening element, here the closing eye bolt 100.

The rear part element 14 is in each case, depending on the connection element size, equipped with two or three respective positioning spigots per side. The embodiments shown in FIGS. 1a to 3c in this respect each have two positioning spigots 20 per side, whereas the embodiment shown in FIG. 3d is equipped with a respective three positioning spigots 20 per side.

The smaller connection elements 10, 10', 10", 10''' which are predominantly used are equipped with a respective one fastening element 100, four positioning spigots 20 and two throughgoing rivet bores 30 per flank; the larger dimensions are equipped with two fastening elements 100, six spigots 20 and three rivet bores 30 per flank, as is shown in FIGS. 3a-d, for example.

The positioning spigots 20 project at the front side after the plugging together of the two part elements 12, 14.

The front, inwardly disposed fastening pin 110 serves, on the use of closing eye bolts, as a fastening element, as a counterholder, for example, as is shown in FIG. 1. The rear, inwardly disposed fastening pin 120 serves, just as also the front, inwardly disposed fastening pin 110, for fixing the part elements 12 and 14.

Figure 4B:
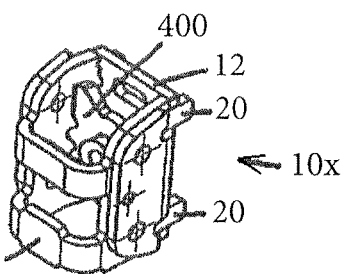
Figure 4C:
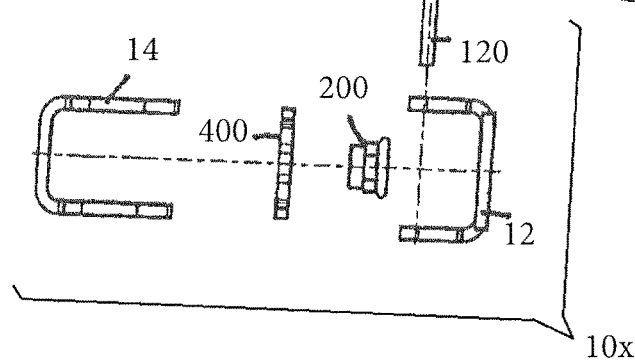

On the use of flange nuts 200 (cf. FIGS. 4a-c) or flange screws 300 (cf. FIGS. 5a-c) as a fastening element 200 or 300 respectively, a fastening attachment 400 is used, which can be of the same construction for both applications, for fastening the flange nut 200 or the flange screw 300 respectively, instead of the front, inwardly disposed fastening pin 110. It receives the fastening element 200 or 300 via a hexagon socket 410 and fixes it in position and location. The fastening attachment 400 also transmits the assembly torque from the fastening element 200 or 300 to the connection element 10x or 10y.

The fastening attachment 400 has two nose-like projections 420 which can be inserted into corresponding receivers 15 of the second U-shaped part element 14 and hold the fastening attachment 400 substantially in the correct position and in a clamping manner in the assembled state (cf. FIGS. 4a-c and 5a-c).

The rear pin 120 fixes the two U-shaped part elements 12 and 14 of the connection element 10x or 10y, which is of the same construction as the first embodiment shown in FIGS. 1a to 2c to this extent, after the plugging together.

Each of the part elements 12, 14 has two to three throughgoing rivet bores 30 at their flanks, said rivet bores being aligned with one another after the assembly.

Figure 6:
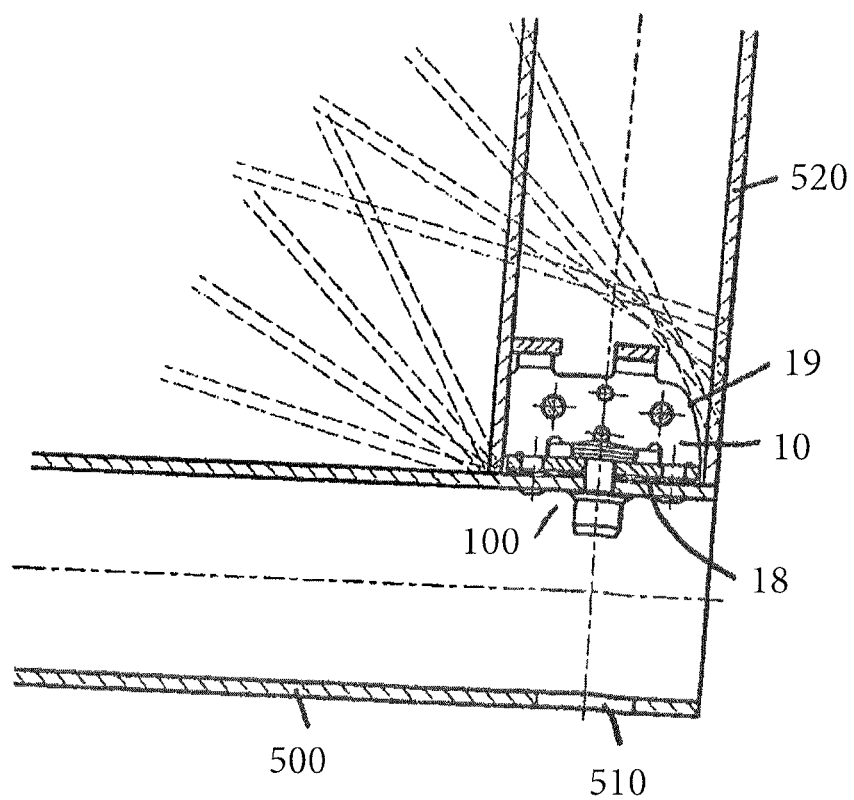
FIG. 6 shows a schematic sectional representation of the installation situation of a connection element with a representation of the continuous angle variance.

The connection element 10 has at its lower end face a planar support surface 18 which represents the reference plane for the installation or for the connection of two hollow section elements 500, 520. The upper end face is provided with a rounded portion 19 whose center axis results from the intersection of the reference plane with the front plane. This rounded portion ensures the continuous installation of the same connector at an angle from 0° to 90° and thus the realization of angular connections from 0° to 360° (cf. FIG. 6). To be able to assemble the fastening element 100, the hollow section element 500 has a corresponding access opening 510 via which the fastening element 100 can be assembled by means of a tool or, on the use of fastening element 200 and 300 respectively, these can be assembled accordingly.

Figure 7A:
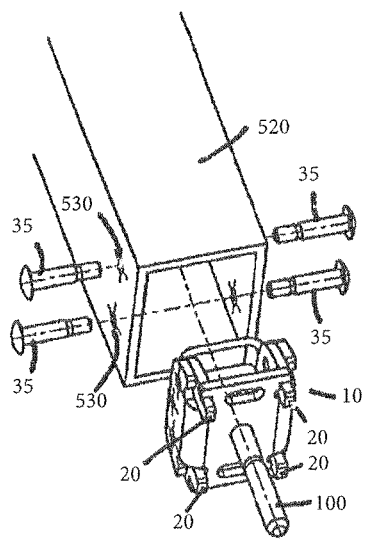
FIGS. 7a-c show perspective representations of different assembly situations of the connection element.
Figure 7B:
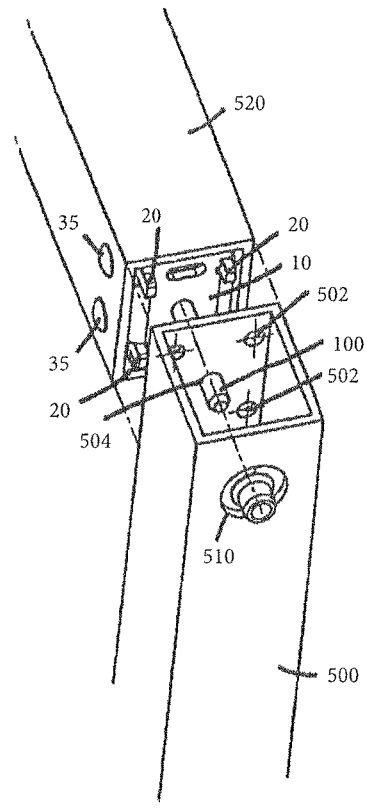
Figure 7C:
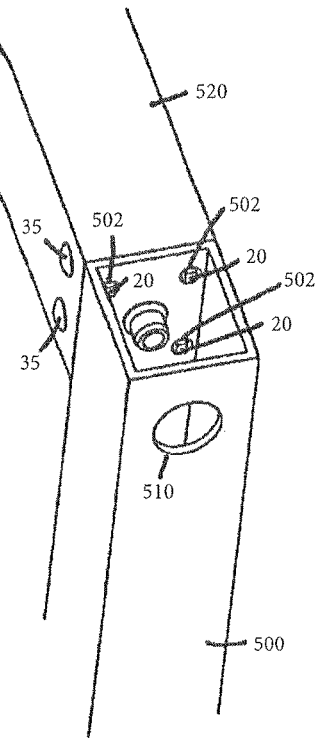

On each establishing of a connection (cf. FIGS. 7a-c), the end surface of the one hollow section element 520 is pressed onto the provided outer jacket surface of the other hollow section element 500. The hollow section element 520 that has an end face that is applied contains the connection element 10 in this respect. The latter is pushed into the hollow section 520 at the end face, with the positioning spigots 20 and the closing eye bolt 100 facing outwardly.

The fixing takes place at both sides by means of rivet connections through the rivet bores 30, 530 in the hollow section and in the flanks of the connection element 10 with rivets 35, the rivet bores being intended for this purpose, being throughgoing and being of the same alignment. The front surface of the connection element 10 is inwardly offset toward the end face of the hollow section 520. The positioning spigots 20 project out of the hollow section element 520.

The counterbore pattern matching the connection element 10 is located in the jacket surface of the counter-hollow section element 500. In this respect, the outer bores 502 serve as guides for the positioning spigots 20 and thus ensure the clear and exact location of the hollow section elements 500, 520 with respect to one another, as also a security against rotation. The middle bore 504 of the bore pattern serves for receiving the fastening element 100 of the connection element 10.

The circular assembly opening 510 is located in the jacket surface of the same hollow section element 500 disposed opposite the bore pattern. With a plurality of fastening elements 100 (cf. FIG. 3d), a plurality of assembly openings 510 can also be provided. Said opening(s) is/are arranged concentric to the middle bore(s) of the bore pattern for the fastening element(s) 100.

After the plugging together of the two hollow section elements 500, 520, they are connected to one another with a precisely defined preload force, non-releasably (with a closing eye bolt attachment) or releasably (with a screw or nut attachment), with the aid of the fastening elements 100.

In this respect, the counter element associated with fastening element (for example a closing ring with a closing eye bolt, a screw with a nut or a nut with a screw) is introduced through the respective assembly opening and the connection is established with the matching tool.

Figure 8:
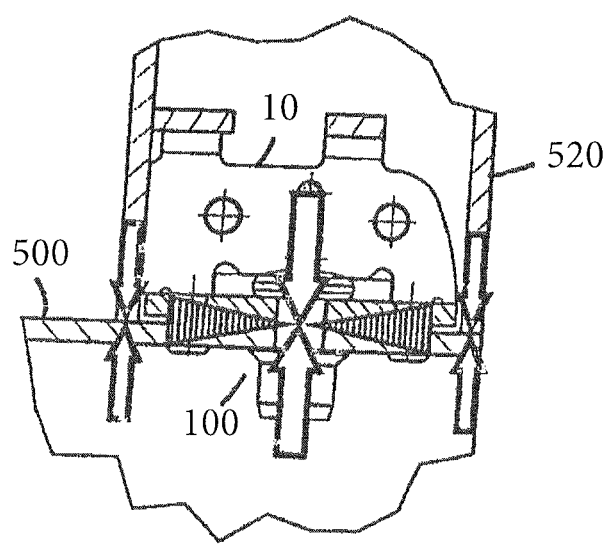
FIG. 8 shows a schematic representation of the concept of the flow of forces of the assembled connection element.

FIG. 8 shows a schematic representation of the force flow concept of the assembled connection element 10 which connects the two hollow sections 500 and 520. That gap which exists due to the installation offset of the connection element in the hollow section between the front surface of the connector and the jacket surface of the counter-hollow section is closed by the introduced preload force. This preload force is transmitted directly into the contact surface between the two hollow section elements 500, 520 due to this gap and thus generates that contact pressure which is required for the stability of the connection.

The invention claimed is:

1. A connection element for a support frame system comprising:
   a first part element configured substantially in U form having a first open end and a second part element also configured substantially in U form having a second open end, the first and second part elements being joinable together so that the first and second open ends face one another,
   an attachment having projections inserted into corresponding receivers of the second part element that hold the attachment in a correct position when the connection element is in an assembled state with the first and second part elements joined together,
   a fastening element at least partly receivable within a socket in the attachment having the projections, the attachment transmitting assembly torque from the fastening element, and
   positioning elements, included as part of the second part element, that project beyond the first part element when the connection element is in the assembled state.

2. The connection element in accordance with claim 1, wherein the fastening element is or includes at least one of a nut and a screw.

3. The connection element in according with claim 2, wherein the socket is a hexagon socket into which the nut or the screw is insertable.

4. The connection element in accordance with claim 1, wherein the projections include at least two nose-like projections, and the nose-like projections are insertable into the receivers.

5. The connection element in accordance with claim 1, wherein each of the positioning elements is or includes at least one positioning spigot.

6. The connection element in accordance with claim 1, wherein each of the first and second part elements has at least two throughgoing rivet bores per flank that are aligned in an assembled state of the connection element.

7. A support frame system comprising:
   at least two support frame elements, and
   at least one connection element according to claim 1,
   wherein the support frame elements are connectable by way of the at least one connection element.

8. The support frame system in accordance with claim 7, wherein at least one of the support frame elements has bores into which said positioning elements are insertable.

9. The support frame system in accordance with claim 7, wherein the at least one connection element has a gap toward a countersection that is closed by a preloading force on assembly.

10. The support frame system in accordance with claim 7, wherein at least one of the support frame elements has rivet bores, and wherein rivets are insertable through the rivet bores into rivet bores of the at least one connection element.

11. A connection element for a support frame system comprising:
    a first part element configured substantially in U form having a first open end and a second part element also configured substantially in U form having a second open end, the first and second part elements being joinable together so that the first and second open ends face one another,
    fastening pins inserted into the first and second part elements to secure the first and second part elements together when the connection element is in an assembled state with the first and second part elements joined together,
    a closing eye bolt projecting through the first part element, and
    positioning elements, included as part of the second part element, that project beyond the first part element when the connection element is in the assembled state.

12. The connection element in accordance with claim 11, wherein at least one of the fastening pins fastens and fixes the closing eye bolt.

13. A support frame system comprising:
    at least two support frame elements, and
    at least one connection element according to claim 11,
    wherein the support frame elements are connectable by way of the at least one connection element.

* * * * *